Nov. 27, 1934.  W. H. DE LANCEY  1,982,376
CONNECTION FOR FILTERS AND THE LIKE
Filed May 31, 1933
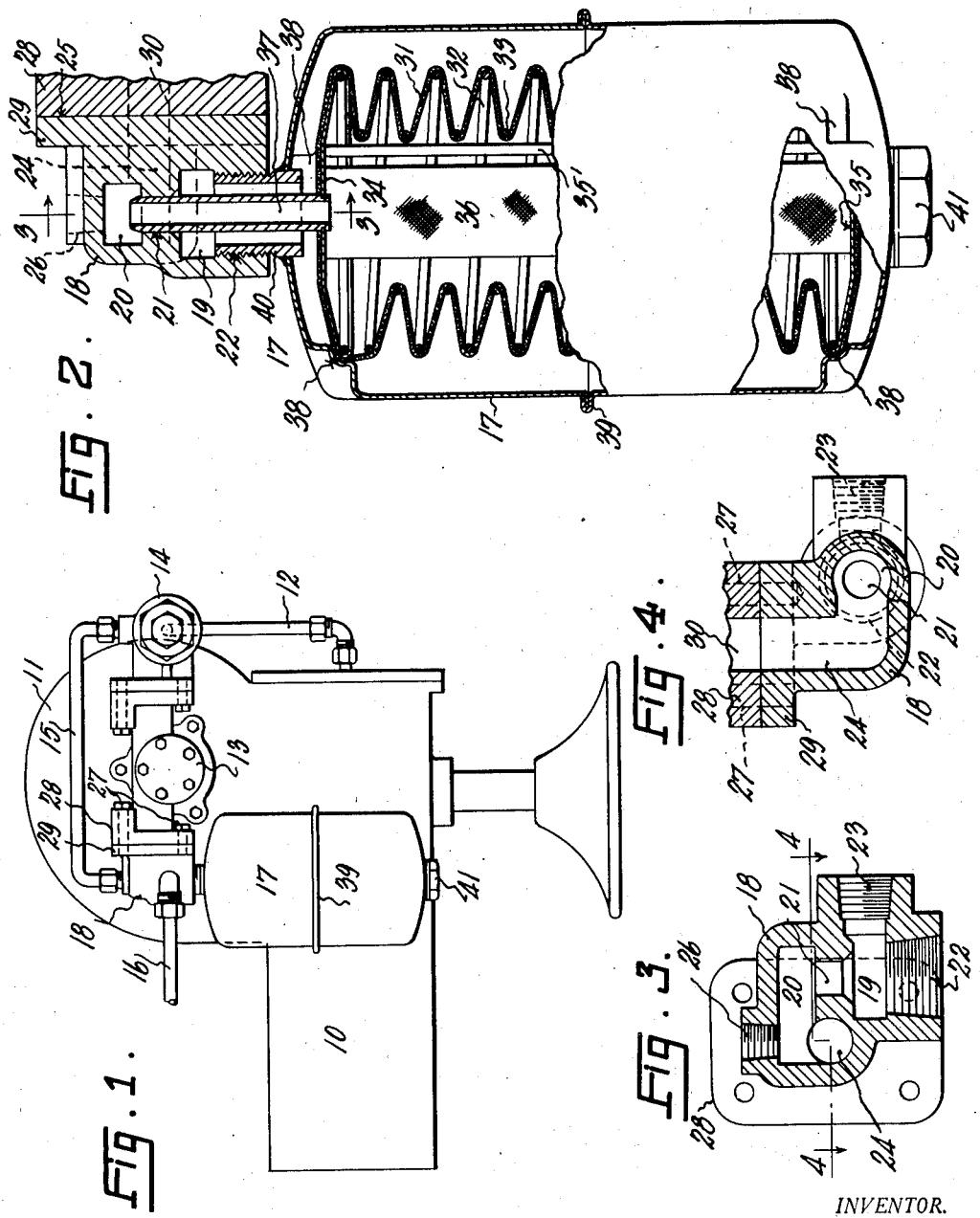
INVENTOR.
WARREN H. DE LANCEY
BY Chapin & Neal
ATTORNEYS.

Patented Nov. 27, 1934

1,982,376

UNITED STATES PATENT OFFICE 1,982,376

CONNECTION FOR FILTERS AND THE LIKE

Warren H. De Lancey, Springfield, Mass., assignor to Gilbert & Barker Manufacturing Company, West Springfield, Mass., a corporation of Massachusetts Application May 31, 1933, Serial No. 673,718

2 Claims. (Cl. 210—164)

This invention relates to an improved means for connecting a filter or the like into the pipe line of a pumping system, such for example as the pumping system of an oil burner.

In servicing an oil burner, it is necessary frequently to remove the filter, either for the purpose of taking it apart and cleaning it or, in the case of the filter shown herein, replacing it with a new one. With the arrangements now commonly used, the pipe line has to be disconnected at two or more points to enable the filter to be removed. This requires considerable time and also considerable care, when the filter is replaced, to get thoroughly oil tight joints. The service man is usually not as skilled a workman as the one who installed the burner and often leaks result from faulty connections made by the service man in replacing the filter.

The object of this invention is to provide for quick and convenient removal and replacement of the filter and to make the work so simple that it can be done properly even by an unskilled workman.

More particularly, the invention has for an object to provide a member which can be permanently connected in the pipe line of the pumping system and from which the filter is supported by a single detachable connection so that the filter may be removed by the simple act of turning it. The single connection may be an ordinary pipe thread which can be made tight by an unskilled workman more readily than unions and like connections. There is but one joint to seal as against the two or more joints which are necessary to seal with the arrangements now in common use.

Other objects will appear from the following description and will be pointed out in the appended claims.

The invention will be disclosed with reference to the accompanying drawing, in which:

Fig. 1 is a small scale elevational view showing in more or less conventional form an oil burner and a pumping system therefor, in which my invention is embodied;

Fig. 2 is a sectional elevational view of the filter and the member which supports it from the pump;

Fig. 3 is a cross sectional view of said member taken on the line 3—3 of Fig. 2; and Fig. 4 is a sectional plan view thereof taken on the line 4—4 of Fig. 3.

Referring to this drawing; the invention will be disclosed, by way of illustrative example, in connection with the pumping system of an oil burner. In Fig. 1 there is shown, in more or less conventional form, an oil burner having a tube or barrel 10 to which air is supplied by a power driven fan 11. The nozzle of the burner, housed within tube 10, is supplied with oil by way of a pipe 12 from a pump 13 coupled to the fan. As shown, there is interposed between the pressure side of pump 13 and pipe 12 a pressure regulating and by-pass valve 14, having its by-pass port connected by a pipe 15 to the suction side of pump 13. Oil is supplied to the pump by way of a pipe 16. A filter, housed within a casing 17, is provided through which the oil from pipe 16 passes before reaching the pump 13.

The problem of this invention is to provide for the convenient and easy removal and replacement of the filter without requiring, as a prerequisite, the disconnection of parts of the pipe line. To this end, a member 18 is provided which forms a normally fixed and stationary part of the pipe line of the pumping system and to which the inlet pipe 16, the by-pass pipe 15 and pump 13 may be connected permanently in the sense that such connections need not be detached to permit removal of the filter. This member, which is ordinarily a casting, is cored out to provide inlet and outlet chambers 19 and 20 respectively, disposed at different levels with part of one, such as 20, overlying part of the other, as 19. Interconnecting such parts of the two chambers is a vertical passage 21 and aligned with this passage 21 and leading from the inlet chamber 19 downwardly is a passage 22 which extends to the lower outer face of member 18 and is adapted, as by the screw threads shown, for connection to the filter in a manner to permit convenient attachment and detachment of the latter. The passage 22 is of larger diameter than passage 21. The inlet chamber 19 has a port 23 which is screw threaded to receive the pipe 16. The outlet chamber 20 has an outlet passage 24 leading to and through the flanged face 25 of member 18 and a port 26 which is screw threaded to receive the by-pass pipe 16. If no such by-pass pipe is used the port 26 may be plugged. The face 25 of member 18 abuts a flanged end of pump 13 and is secured thereto by cap screws 27 which pass through the flange 28 of pump 13 and are threaded into the flange 29 of member 18. This flanged end of pump 13 has a passage 30 which forms the intake of the pump and which registers with passage 24.

The filter shown herein by way of illustrative example, comprises a filtering wall 31 of suitable flexible material mounted on inner and outer helical supports 32 and 33, and upper and lower heads 34 and 35 which with said wall form a complete enclosure. Within such enclosure is a second filtering element comprising a cylindrical screen 36 mounted between and closed at its ends by the heads 34 and 35. The heads 34 and 35 are held together by suitable rods, one of which is shown at 35'. The upper head has connected thereto an outlet pipe 37 which communicates at its lower end with the space within screen 36. This filtering unit is supported within casing 17 and in spaced relation with the end walls and the peripheral wall thereof by a plurality of lugs 38 formed by indenting the casing 17 at a plurality of points near the top and near the bottom thereof. The casing, as shown, is made in two sections, comprising an upper and a lower cup-like portion. The filtering unit is slipped into place and seated in one of these sections and then the other section is slipped into place over the filtering unit, after which the two sections are fastened together by the crimped seam 39. This form of filter is not intended to be taken apart. After it has been used as long as possible it is removed and a new one substituted. Obviously, any other suitable form of filter may be used as the invention is independent of the particular construction of the filter. The casing 17 has an inlet pipe 40 leading into the upper part thereof and communicating with the space outside the filtering unit 31. At the bottom of the casing is a plug 41 which is readily removable, when required, for draining off any sludge which may collect in the bottom of the casing.

The filter is supported from the member 18 by screwing the inlet pipe 40 into the passage 22. The filter outlet pipe 37 extends beyond the end of pipe 40 and into the passage 21,—the upper end of the pipe 37 preferably being chamfered and the lower end of passage 21 preferably being countersunk to facilitate the entrance of the pipe into passage 21. The pipe 37 slidably fits passage 21 and closely enough to substantially close off direct communication between the inlet and outlet chambers 19 and 20, respectively of member 18. When the filter is thus connected to member 18, oil entering at port 23 flows down into the outer part of the filter casing 17 through the space between the pipes 40 and 37, then passes through the filtering unit and flows upwardly through pipe 37 into outlet chamber 20 and thence by way of passages 24 and 30 to pump 13.

The by-pass pipe 15, being connected to the outlet chamber 20 of member 18, enables excess pumped oil to be returned to the suction side of the pump without requiring such oil to again pass through the filter as has been usual heretofore,—thus prolonging the life of the filtering unit to a substantial extent under the usual conditions where a great deal more oil is pumped than is consumed by the nozzle. Hence, since much of the pumped oil is by-passed, it is desirable to avoid passing it through the filter an unnecessary number of times.

The invention provides for quick and convenient removal and replacement of the filter without disconnecting any parts of the pipe line. One simply unscrews the pipe nipple 40 of the filter and then withdraws it and pipe 37 from member 18. A new unit is put in place in correspondingly easy fashion. The pipe 37 is slid through hole 22 and chamber 19 until its upper end lies in the lower and entrance end of passage 21. The nipple 40 will then be in position to screw into hole 22 and as it is screwed into place, pipe 37 slides upwardly in passage 21 until it finally assumes the position shown. The entire pipe line of the pumping system may be connected permanently with the assurance that once connections of satisfactory oil-tight form are made, they will not have to be later impaired in order to remove and replace a filter. The work of removal of the filter and replacing it with a new one is reduced to the simplest possible form. There is but one connection to make,—that between pipe 40 and hole 22,—and this is of a character which can easily be made tight even by a relatively unskilled workman. The invention fills an important need in connection with oil burners.

The invention has been disclosed herein, in an embodiment at present preferred, for illustrative purposes, but the scope of the invention is defined by the appended claims rather than by the foregoing description.

What I claim is:

1. In a pumping system, wherein a pump is interposed in a pipe line and a by-pass conduit is provided to interconnect the pressure with the suction side of the pump, a member secured to the suction side of said pump and having an outlet chamber communicating therewith and with said by-pass conduit, said member having an inlet chamber connected to the suction side of said pipe line and a passage interconnecting said chambers, said member having another and larger passage aligned with the first passage but extending in the opposite direction from the inlet chamber to an outer wall of said member, and a filter having an inlet pipe detachably connected to said larger passage and an outlet pipe extending through the inlet pipe and beyond the outer end thereof and across the inlet chamber and into said smaller passage, said inlet pipe closely fitting said smaller passage and closing off direct communication between the inlet and outlet chambers of said member.

2. In combination, a coupling member having inlet and outlet passages each adapted at one end for connection to a pipe line, the other ends of said passages terminating with cylindrical end portions of different diameters and disposed in radially spaced concentrical relation, a filter having fixed thereto inlet and outlet pipes of different diameters disposed in radially spaced concentrical relation, both said pipes having open outer ends, the smaller pipe removably mounted in the smaller end portion with a slip fit, the larger pipe being threaded into the larger end portion and the screw threaded engagement of the larger pipe and larger end portion serving to support the filter from said member.

WARREN H. DE LANCEY.